(12) United States Patent
Ross

(10) Patent No.: US 11,461,433 B2
(45) Date of Patent: Oct. 4, 2022

(54) ERROR CORRECTION IN COMPUTATION

(71) Applicant: Groq, Inc., Mountain View, CA (US)

(72) Inventor: Jonathan Alexander Ross, Palo Alto, CA (US)

(73) Assignee: GROQ, INC., Mountain View, CA (US)

( * ) Notice: Subject to any disclaimer, the term of this patent is extended or adjusted under 35 U.S.C. 154(b) by 535 days.

(21) Appl. No.: 16/475,297

(22) PCT Filed: Jan. 10, 2018

(86) PCT No.: PCT/US2018/013119
§ 371 (c)(1),
(2) Date: Jul. 1, 2019

(87) PCT Pub. No.: WO2018/132444
PCT Pub. Date: Jul. 19, 2018

(65) Prior Publication Data
US 2019/0332467 A1    Oct. 31, 2019

Related U.S. Application Data

(60) Provisional application No. 62/444,950, filed on Jan. 11, 2017.

(51) Int. Cl.
*G06F 17/16* (2006.01)
*G06F 11/07* (2006.01)
(Continued)

(52) U.S. Cl.
CPC .............. *G06F 17/16* (2013.01); *G06F 7/026* (2013.01); *G06F 11/079* (2013.01); *G06F 11/0793* (2013.01); *G06F 11/104* (2013.01)

(58) Field of Classification Search
CPC ...................................................... G06F 17/16
See application file for complete search history.

(56) References Cited

U.S. PATENT DOCUMENTS

2007/0050659 A1    3/2007  Ferren et al.
2011/0131462 A1    6/2011  Gunnam
(Continued)

OTHER PUBLICATIONS

Moldaschl et al., "Fault Tolerant Communication-Optimal 2.5D Matrix Multiplication", pp. 2-21. (Year: 2016).*
(Continued)

*Primary Examiner* — Chuong D Ngo
(74) *Attorney, Agent, or Firm* — Fenwick & West LLP

(57) ABSTRACT

Introduced here is a technique to detect and/or correct errors in computation. The ability to correct errors in computation can increase the speed of the processor, reduce the power consumption of the processor, and reduce the distance between the transistors within the processor because the errors thus generated can be detected and corrected. In one embodiment, an error correcting module, running either in software or in hardware, can detect an error in matrix multiplication, by calculating an expected sum of all elements in the resulting matrix, and an actual sum of all elements in the resulting matrix. When there is a difference between the expected sum and the resulting sum, the error correcting module detects an error. In another embodiment, in addition to detecting the error, the error correcting module can determine the location and the magnitude of the error, thus correcting the erroneous computation.

20 Claims, 10 Drawing Sheets

(51) Int. Cl.
*G06F 11/10* (2006.01)
*G06F 7/02* (2006.01)

(56) References Cited

U.S. PATENT DOCUMENTS

| | | |
|---|---|---|
| 2011/0276854 A1 | 11/2011 | Lablans |
| 2012/0005513 A1 | 1/2012 | Brock et al. |
| 2015/0188578 A1 | 7/2015 | Sugihara et al. |

OTHER PUBLICATIONS

Wu et al., "Fault Tolerant Matrix-Matrix Multiplication: Correcting Soft Errors On-Line"., pp. 1-18. (Year: 2011).*
European Patent Office, Extended European Search Report and Opinion, EP Patent Application No. 18738977.0, dated Jul. 27, 2020, eight pages.
Huang, K. et al., "Algorithm-Based Fault Tolerance for Matrix Operations," IEEE Transactions on Computers, vol. 33, Jun. 1984, pp. 518-528.
PCT International Search Report and Written Opinion, PCT/US2018/013119, dated Mar. 30, 2018, 16 Pages.
Ding et al. "Matrix Multiplication on GPUs with On-line Fault Tolerance" In: Ninth IEEE International Symposium on Parallel and Distributed Processing with Applications, May 26-28, 2011. [retrieved on Mar. 15, 201B (Mar. 15, 2018)) Retrieved from the Internet <URL: 1•9. 14-1B hltp://ieeexplore.ieee.org/documenU5951924/>, entire document, especially, Abstract; p. 1, col. 2: p. 2, col. 2: p. 4, col. 1.

* cited by examiner

ERROR CORRECTION IN COMPUTATION

CROSS REFERENCE TO RELATED APPLICATIONS

This application claims priority to U.S. Provisional Patent Application No. 62/444,950 filed on Jan. 11, 2017, the contents of which are incorporated by reference herein in their entirety.

TECHNICAL FIELD

One or more embodiments of the present application are related to detecting and correcting errors during computation, and more specifically to methods and systems that detect and correct errors in matrix multiplication.

BACKGROUND

In modern-day processors, the speed of the processor, the power consumption of the processor and the distance between transistors within processor, are determined such that the least reliable transistor of the processor can operate without an error. Increasing the speed of the processor by increasing the frequency of the internal clock can result in errors in the least reliable transistors of the processor. Similarly, decreasing the power consumption of the processor, or decreasing the distance between the computational units of the processor, also can result in erroneous computation.

SUMMARY

One or more embodiments introduced herein may include a technique to detect and/or correct errors in computation. The ability to correct errors in computation can increase the speed of the processor, reduce the power consumption of the processor, and reduce the distance between the transistors within the processor, because the errors thus generated can be detected and corrected. In one embodiment, an error correcting module, running either in software or in hardware, can detect an error in matrix multiplication by calculating an expected sum of all elements in the resulting matrix and an actual sum of all elements in the resulting matrix. When there is a difference between the expected sum and the resulting sum, the error correcting module detects an error. In another embodiment, in addition to detecting the error, the error correcting module can determine the location and the magnitude of the error, thus correcting the erroneous computation.

BRIEF DESCRIPTION OF THE DRAWINGS

These and other objects, features, and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
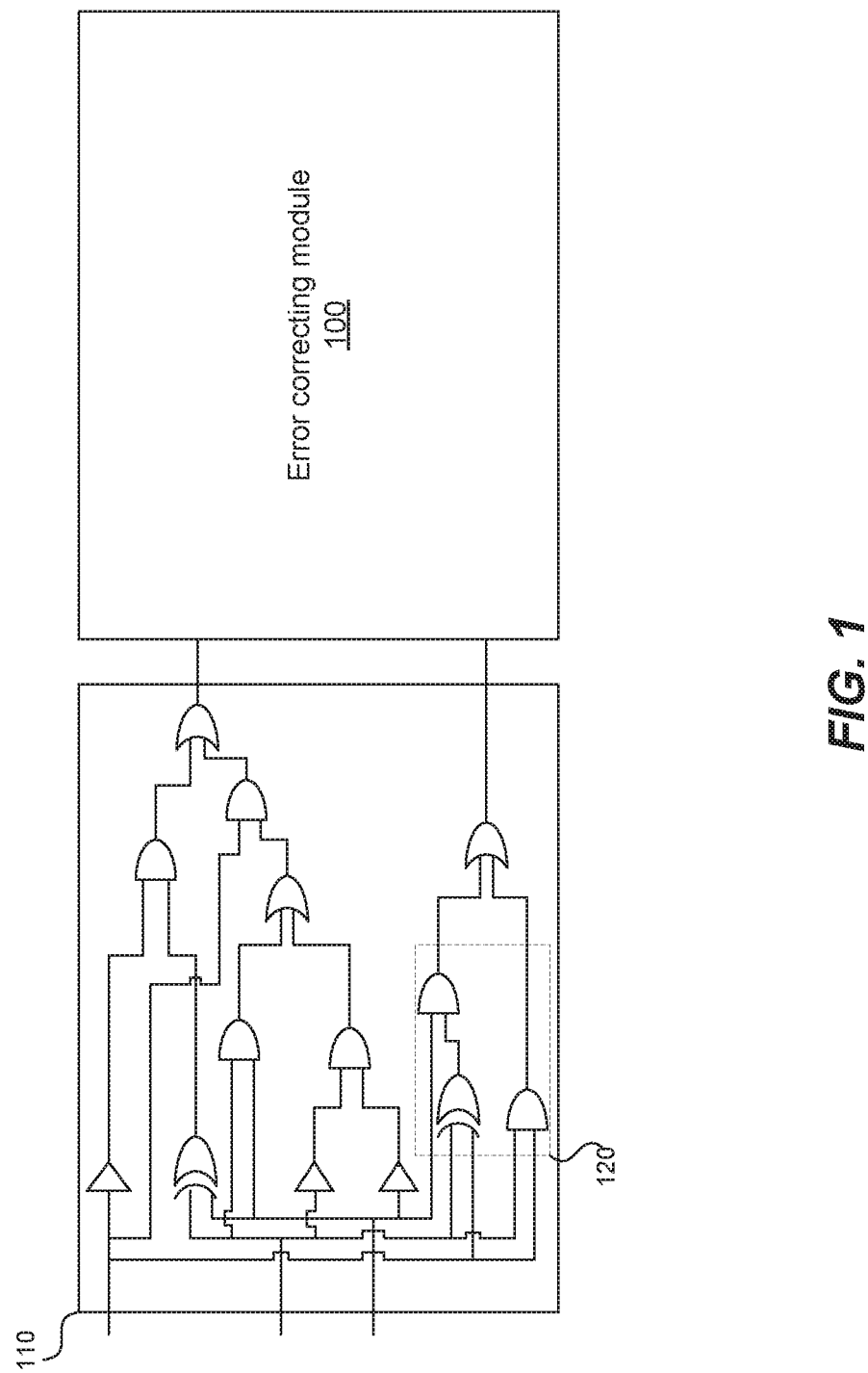
FIG. 1 shows an apparatus that includes an electronic circuit and a computational error correcting module, according to one embodiment.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between while not sharing any physical connection with one another. Additionally, the words "herein," "above," "below," and words of similar import, when used in this application, shall refer to this application as a whole and not to any particular items of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure and in the specific context where each term is used. For convenience, certain terms may be highlighted, for example, using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to the various embodiments given in this specification.

Technology

One or more embodiments disclosed herein may include a technique to detect and/or correct errors in computation. The ability to correct errors in computation can increase the speed of the processor, reduce the power consumption of the processor, and reduce the distance between the transistors within the processor because the errors thus generated can be detected and corrected. In one embodiment, an error correcting module, running either in software or in hardware, can detect an error in matrix multiplication, by calculating an expected sum of all elements in the resulting matrix and an actual sum of all elements in the resulting matrix. When there is a difference between the expected sum and the resulting sum, the error correcting module detects an error. In another embodiment, in addition to detecting the error, the error correcting module can determine the location and the magnitude of the error, thus correcting the erroneous computation.

FIG. 1 shows an apparatus that includes an electronic circuit and a computational error correcting module, according to one embodiment. The error correcting module 100 is connected to an electronic circuit 110. The error correcting module 100 and the electronic circuit 110 can be part of a single processor or can be separate components. The error correcting module 100 can be an implemented in hardware or can be implemented in software. For example, the error correcting module 100 can run as a software instructions on a processor containing the electronic circuit 110. The error correcting module 100 detects computational errors introduced by the electronic circuit 110, when the electronic circuit 110 performs computations such as matrix multiplication. The error correcting module 100 can detect errors within a computing unit 120 in the electronic circuit 110. As another example, the error correcting module 100 can be an error correcting circuit that includes logic gates, multiplication and addition circuits, and/or other circuits to perform these operations.

The electronic circuit 110 can be a processor, a microcontroller, part of a processor, or part of a microcontroller. The electronic circuit 110 is made up of building blocks such as transistors, memristors, quantum computing elements, etc. The computing unit 120 within the electronic circuit 110 can be as small as a single building block or can be a group of building blocks within the electronic circuit 110. In one embodiment, the electronic circuit 110 is a processor that executes matrix multiplications for a machine learning model. The values in one matrix can be weights from a layer of a machine learning model and the values in another matrix can be input data to the layer of the machine learning model (e.g. image data, audio data). The two matrices are then multiplied together by the electronic circuit 110 to produce a resulting matrix representing an output of the layer of the machine learning model.

Figure 2A:
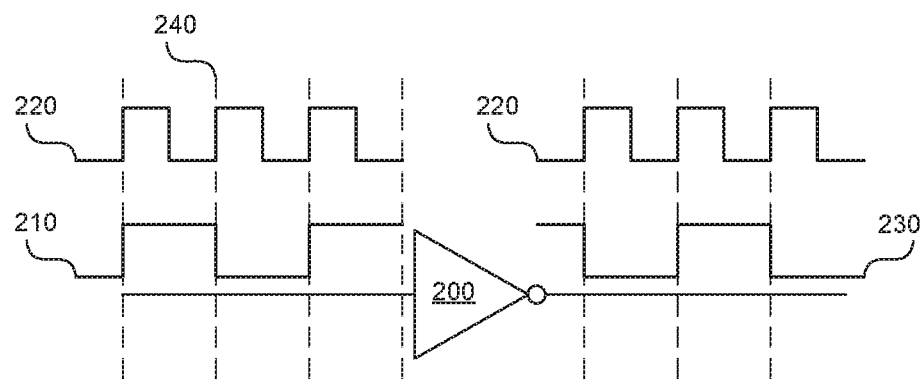
FIG. 2A shows a NOT logic gate, according to one embodiment.

FIG. 2A shows a NOT logic gate, according to one embodiment. The NOT logic gate 200 takes in a variable input 210 and produces an output 230 equivalent to the negated variable input 210. A clock signal 220 is divided into cycles denoted by lines 240 (only one labeled for brevity). Lines 240 denote the end of one clock cycle and the beginning of the next clock cycle. At the beginning of each clock cycle, when the NOT logic gate 200 is operating properly, the NOT logic gate 200 produces the following outputs: when the variable input 210 is 1, the output 230 is 0; when the variable input 210 is 0, the output 230 is 1.

Figure 2B:
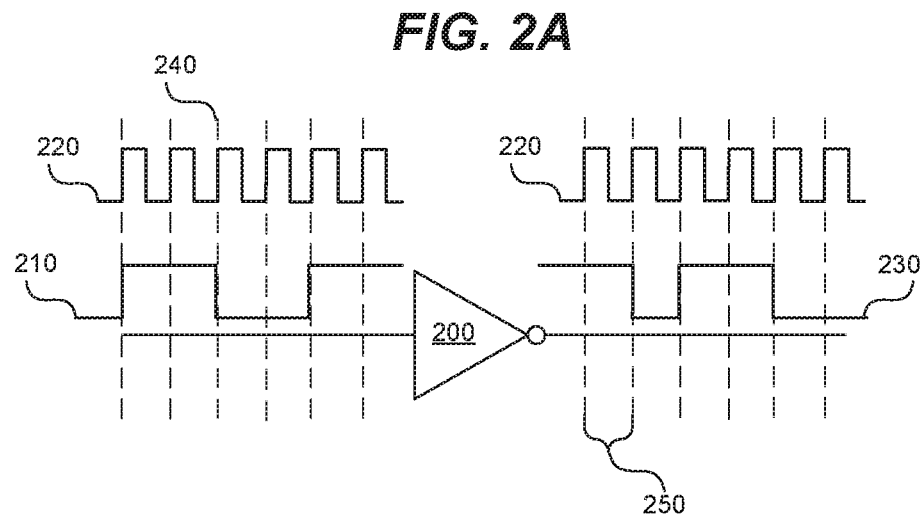
FIG. 2B shows a NOT logic gate, with an increased clock speed, according to one embodiment.

FIG. 2B shows a NOT logic gate with an increased clock speed, according to one embodiment. An increase in the frequency of the clock signal 220 can cause the NOT logic gate 200 to produce erroneous output, because the NOT logic gate 200 does not have sufficient time to discharge between successive clock cycles denoted by lines 240. As shown in FIG. 2B, the NOT logic gate does not properly discharge in the period 250 and erroneously produces an output of 1, instead of 0.

Figure 2C:
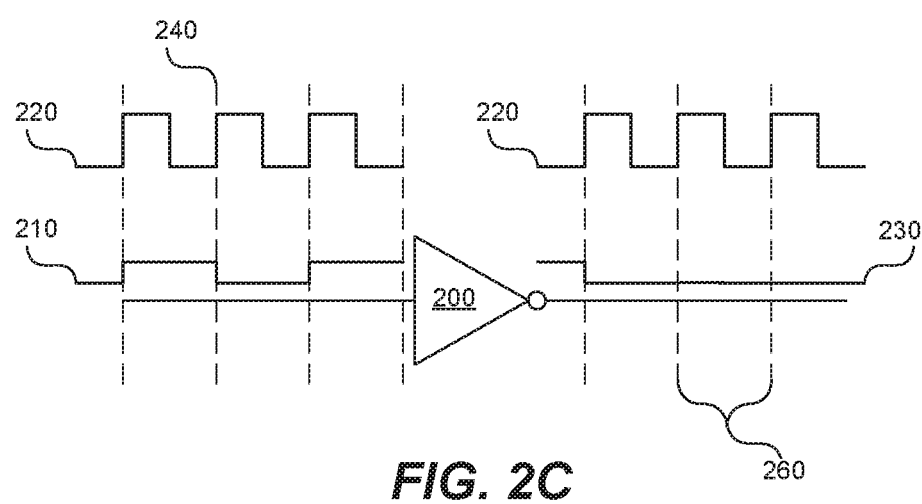
FIG. 2C shows a NOT logic gate, with reduced input voltage, according to one embodiment.

FIG. 2C shows a NOT logic gate with reduced input voltage, according to one embodiment. Decreasing the voltage of the variable input 210 can cause the NOT logic gate 200 to produce erroneous output, because the input voltage is not sufficient to activate the flow of current through the NOT logic gate 200. As shown in FIG. 2C, the NOT logic gate 200 does not properly activate in the period 260 and erroneously produces an output of 0, instead of 1.

Further, placing logic gates closer to each other during electronic circuit printing causes crosstalk in the logic gates, thus causing them to create computational errors. Having the ability to check and correct errors in matrix multiplication enables processor designers and processor producers to create processors that are faster, more power efficient, and more space efficient.

Figure 3:
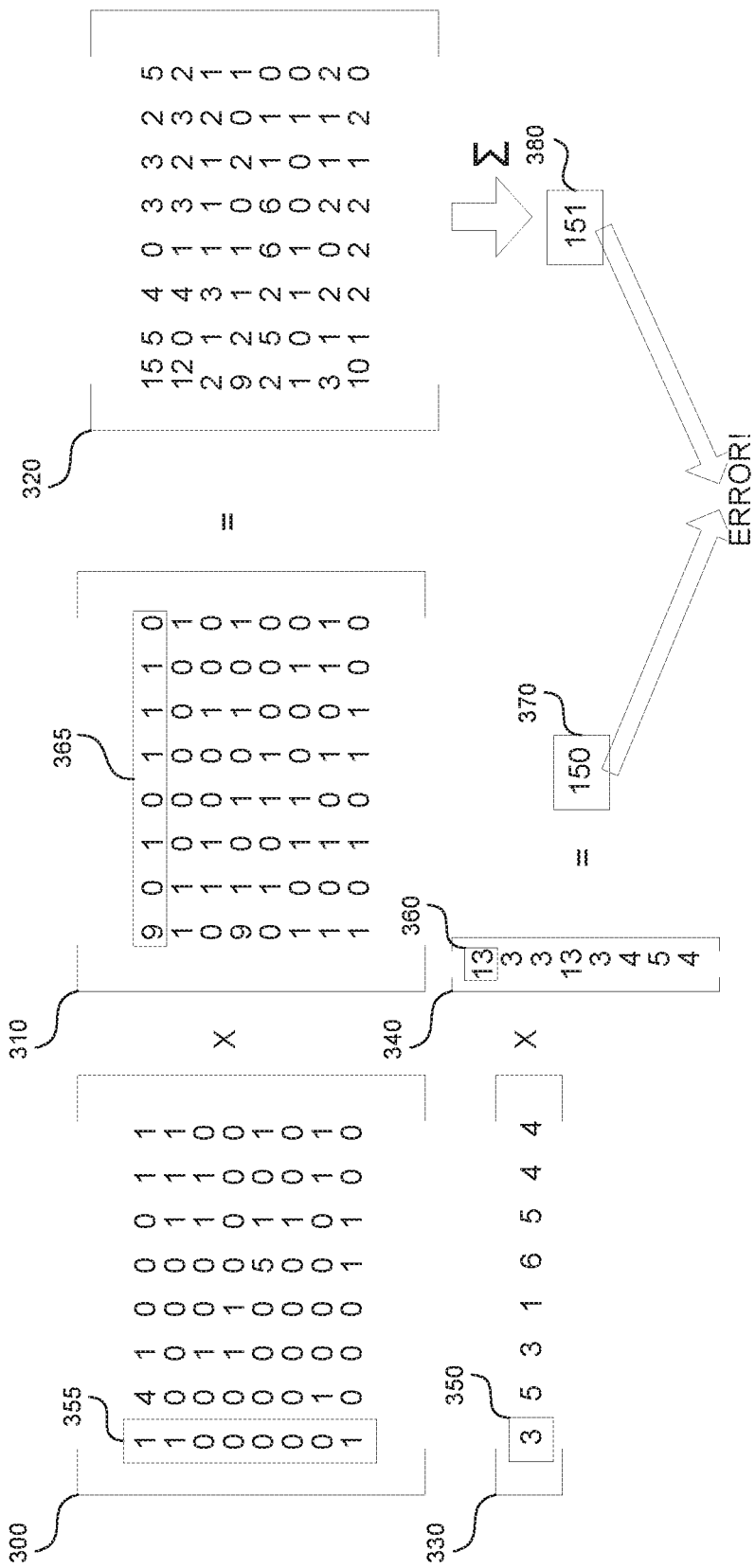
FIG. 3 shows a method to detect an error in matrix multiplication, according to one embodiment.

FIG. 3 shows a method to detect an error in matrix multiplication, according to one embodiment. Two matrices 300 and 310 are multiplied together to obtain a resulting matrix 320. To check whether the resulting matrix 320 is correct, the error correcting module 100 computes two vectors 330, 340. Each element in the vector 330 is a sum of the corresponding column in matrix 300. For example, element 350 is the sum of the column 355. Each element in the vector 340 is a sum of the corresponding row in matrix 310. For example, element 360 is the sum of the row 365. The error correcting module 100 performs a dot product of the two vectors 330, 340 to obtain an expected result 370. The error correcting module 100 also sums all the elements in the resulting matrix 320 to obtain an actual result 380. When the expected result 370 and the actual result 380 are not equal, the error correcting module 100 detects an error.

The benefit of performing the above-described method is that the creation of the two vectors 330, 340, and their dot product, the expected result 370, can require exponentially less computation than performing the matrix multiplication of the two matrices 300 and 310. Let us say that the size of the matrices 300, 310 is N×N, where in FIG. 3, N=8. The number of operations to produce the resulting matrix 320 is $O(N^3)$. In FIG. 3, calculating the resulting matrix 320 requires 8 multiplications and 7 additions for each element in the resulting matrix 320. There are 64 elements in the resulting matrix 320, thus the number of operations to produce the resulting matrix 320 is 8*8*(8 multiplications+7 additions)=$O(8^3)$. The number of operations that may be required to produce the expected result 370 is $O(N^2)$. In FIG. 3, to produce each element in the two vectors 330, 340 requires 7 additions. To produce a dot product of vectors 330, 340 requires 8 multiplications. Thus, producing the expected result 370 may require 7*16 additions+8 multiplications=$O(8^2)$. $O(N^2)$ is by one exponent less than $O(N^3)$. Thus, performing the error correction is at least by one exponent cheaper than performing the matrix multiplication.

Performing multiplications is more expensive than performing additions. Thus, comparing the number of multiplications between the matrix multiplication and the above-described error check is a useful measure of the efficiency of the error check. The number of multiplications that may be required in matrix multiplication is $O(N^3)$. The number of multiplications required in performing the above-described error check is $O(N)$. Thus, the number of multiplications required in the error check is by two exponents cheaper than performing the matrix multiplication.

Once the error is detected, the error correcting module 100 can record the error. Once the error is recorded, the error correcting module 100 can do one or more things. For example, the error correcting module 100 can signal to the electronic circuit 110 to perform the matrix multiplication again. In performing the whole computation again, the electronic circuit 110 can permute the rows and columns, or permute a grouping of elements of matrices 300, 310, in order to prevent the same errors from occurring again.

Further, the error correcting module 100 can measure the rate of error. When the observed rate of the error is above a specified threshold, for example 1, error per second, 1 error per millisecond, etc., the error correcting module 100 can send a message that the electronic circuit 110 should be replaced. The error rate detection can be useful in safety critical systems such as processors in self-driving cars, medical devices, aircraft flight control, weapons, nuclear systems, etc. Knowing when the processor stops working reliably is useful, because a replacement of the processor can be requested.

Similarly, observing the error rate can allow the system to lower the input voltage into the electronic circuit 110, until the error produced by the electronic circuit is above a specified threshold, for example, 1 error per second, 1 error per millisecond, etc. Adjusting the voltage to the electronic circuit 110 dynamically reduces the power consumption by the electronic circuit 110.

In addition, the error correcting module 100 can measure the rate of error for a computing unit 120 within the electronic circuit 110. The computing unit 120 can be a as small as a single building block within the electronic circuit 110 or can be a group of building blocks within the electronic circuit 110. When the rate of error exceeds a predefined threshold, the error correcting module 100 can dynamically adjust the voltage to the computing unit 120, whose rate of error has exceeded the predefined threshold.

Figure 4:
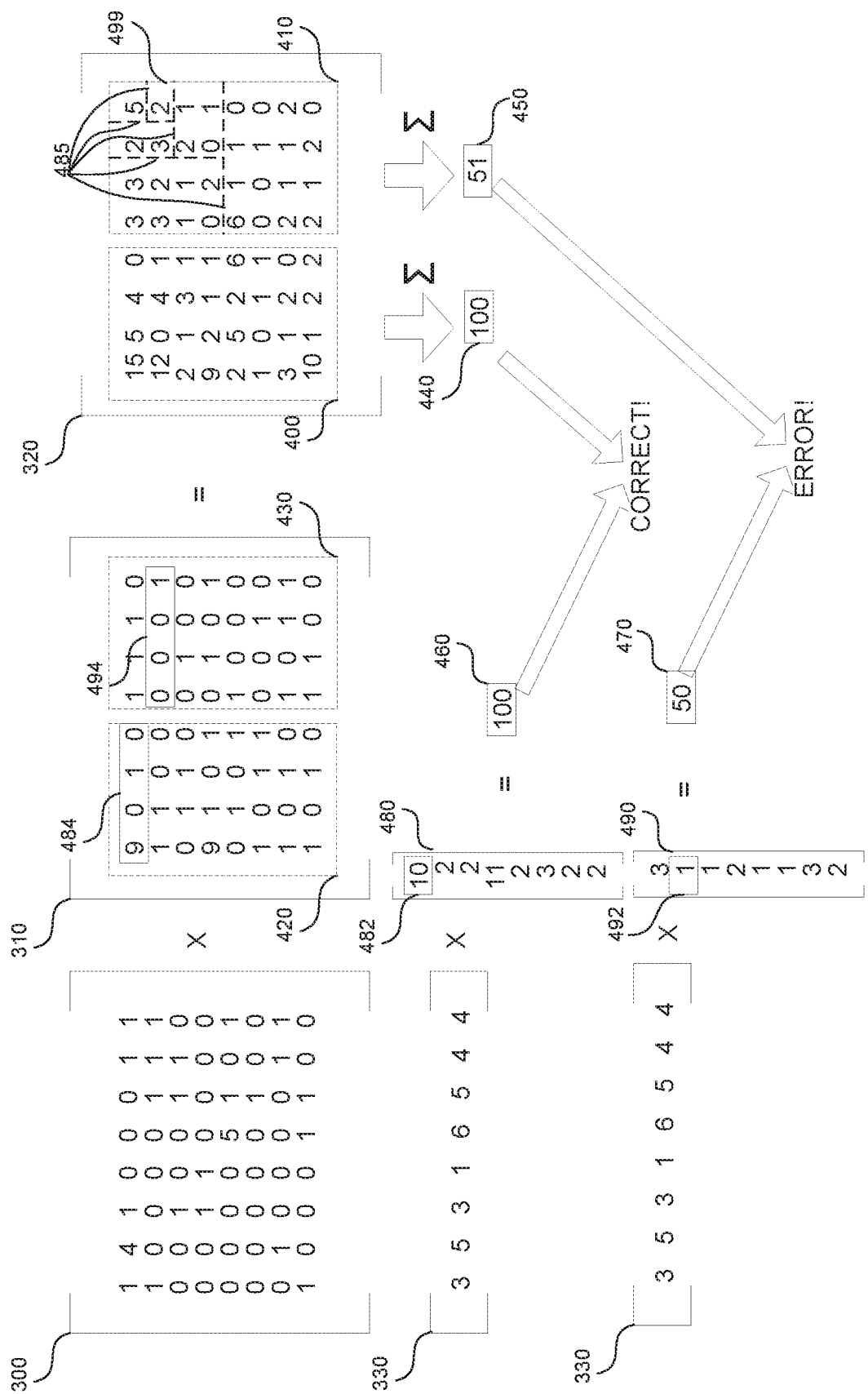
FIG. 4 shows a method to detect and correct an error in matrix multiplication, according to one embodiment.

FIG. 4 shows a method to detect and correct an error in matrix multiplication, according to one embodiment. In general, once error correcting module 100 determines that there is an error in the resulting matrix 320, the error correcting module 100 can subdivide the resulting matrix 320 into multiple sub matrices and perform the same error detecting operation on each sub matrix. The error correcting module 100 can subdivide the resulting matrix into two matrices, as shown in FIG. 4, into three matrices, or into any number of matrices, as long as each sub matrix contains at least one element.

In the particular example of FIG. 4, the error correcting module 100 subdivides the resulting matrix 320 into two sub matrices, 400, 410, and subdivides matrix 310 into corresponding sub matrices 420, 430. When matrix 300 multiplies sub matrix 420, the result is sub matrix 400. When matrix 300 multiplies sub matrix 430, the result is sub matrix 410. The error correcting module 100 then performs the same error detecting operation, as described in FIG. 3, on both resulting sub matrices 400, 410 to produce two actual results 440, 450.

To produce two expected results 460, 470, error correcting module 100 calculates three vectors 330, 480, 490. The vector 330 is calculated in the same way as vector 330 in FIG. 3. Each element in vector 480 is a sum of a corresponding row in sub matrix 420. For example, element 482 in vector 480 is the sum of elements in row 484 in sub matrix 420. Similarly, each element in vector 490 is a sum of the corresponding row in sub matrix 430. For example, element 492 in vector 490 is the sum of elements in row 494 in sub matrix 430.

To determine whether there is an error in the resulting sub matrices 400, 410, error correcting module 100 compares the expected results 460, 470 with the actual results 440, 450. When the expected result 460 matches the actual result 440, there is no error in the corresponding sub matrix 400. Similarly, when the expected result 470 matches the actual result 450, there is no error in the corresponding sub matrix 410. Conversely, when the expected result 460 does not match the actual result 440, the mismatch indicates that sub matrix 400 contains at least one error. When the expected result 470 does not match the actual result 450, the mismatch indicates that sub matrix 410 contains at least one error. As can be seen in FIG. 4, results 440 and 460 match, thus there is no error in the sub matrix 400. Results 450 and 470 do not match, thus there is an error in sub matrix 410.

The error correcting module 100 continues subdividing the matrix containing the error 499 along the dotted lines 485, until the error 499 is found. The method described herein can be employed to find multiple errors in a single resulting matrix 320.

Once the error correcting module 100 finds one or more errors in the resulting matrix 320, the error correcting module 100 can signal to the electronic circuit 110 to perform the whole computation again. In performing the whole computation again, the electronic circuit 110 can permute the rows and columns, or various grouping of elements of matrices 300, 310, in order to prevent the same errors from occurring again. Alternatively, the error correcting module 100 can perform the dot product required to calculate the erroneous element.

Figure 5:
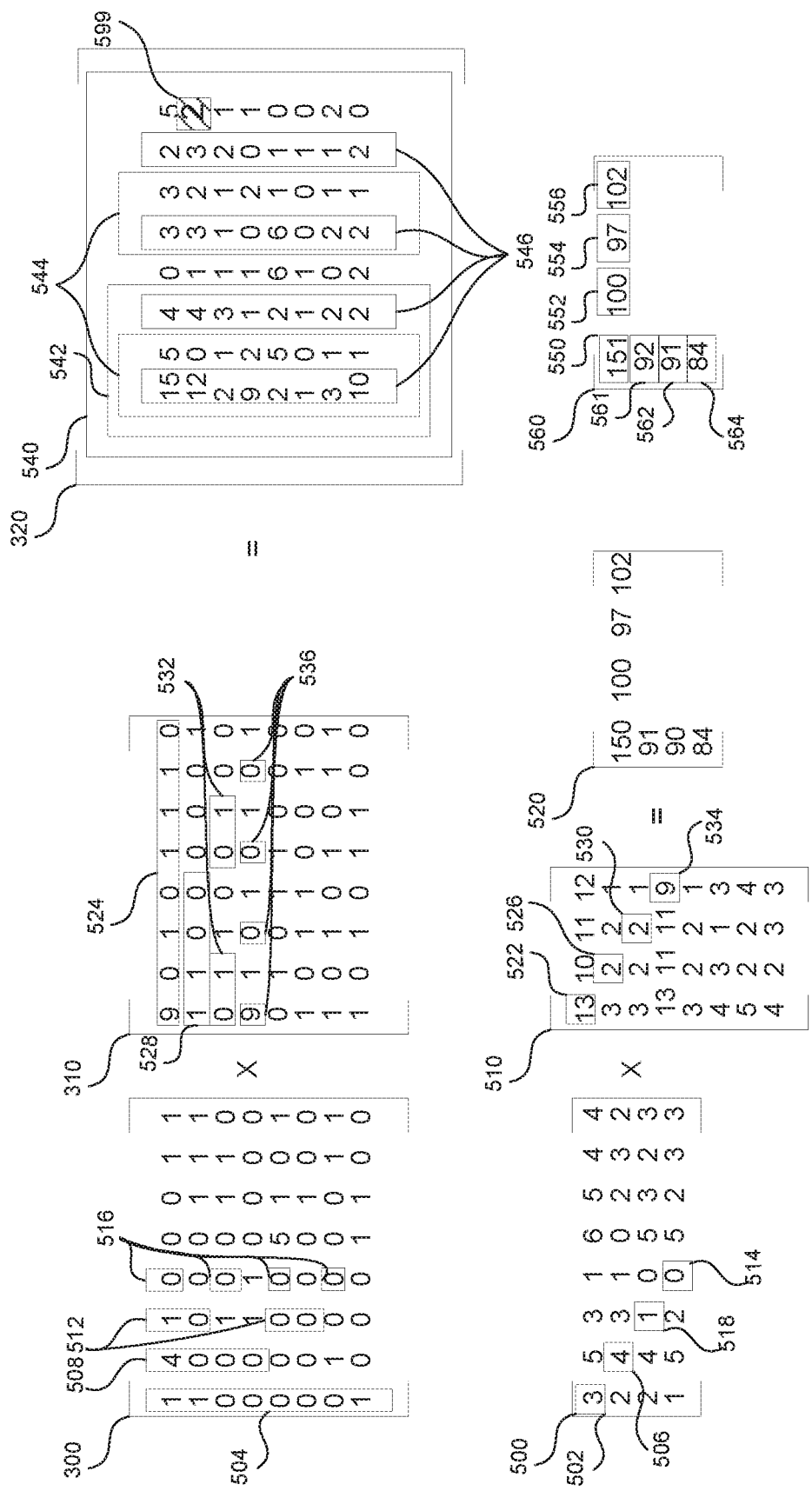
FIG. 5 shows a method to detect and correct an error in matrix multiplication, according to another embodiment.

FIG. 5 shows a method to detect and correct an error in matrix multiplication, according to another embodiment. When the electronic circuit 110 multiplies matrix 300 by matrix 310, the resulting matrix 320 contains an error 599. To detect the error 599, the error correcting module 100 performs a number of calculations that are cheaper than the number of calculations required to multiply matrix 300 by matrix 310. The error correcting module 100 computes two intermediate matrices 500, 510.

Each element in intermediate matrix 500 is a sum of corresponding elements in the matrix 300. Elements in the first row of intermediate matrix 500 are a sum of the corresponding columns in the matrix 300. For example, element 502 in intermediate matrix 500 is the sum of the column 504 in the matrix 300. Elements in the second row of intermediate matrix 500 are a sum of the first four elements of each corresponding column in matrix 300. For example, element 506 in intermediate matrix 500 is the sum of half the column 508 in the matrix 300. Elements in the third row of intermediate matrix 500 are a sum of the first, second, fifth, and sixth elements of each corresponding column in matrix 300. For example, element 518 in intermediate matrix 500 is the sum of elements 512 in the matrix 300. Finally, elements in the fourth row of intermediate matrix 500 are a sum of alternating elements in each corresponding column in matrix 300. For example, element 514 in intermediate matrix 500 is the sum of elements 516 in the matrix 300.

Similarly, intermediate matrix 510 is a sum of corresponding elements in the matrix 310. Elements in the first column of intermediate matrix 510 are a sum of the corresponding rows in the matrix 310. For example, element 522 in intermediate matrix 510 is the sum of the row 524 in the matrix 310. Elements in the second column of intermediate matrix 510 are a sum of the first four elements of each corresponding row in matrix 310. For example, element 526 in intermediate matrix 510 is the sum of half the row 528 in the matrix 310. Elements in the third column of intermediate matrix 510 are a sum of the first, second, fifth, and sixth elements of each corresponding row in matrix 310. For example, element 530 in intermediate matrix 510 is the sum of elements 532 in the matrix 310. Finally, elements in the fourth column of intermediate matrix 510 are a sum of alternating elements in each corresponding row in matrix 310. For example, element 534 in intermediate matrix 510 is the sum of elements 536 in the matrix 310.

Intermediate matrices 500, 510 are partially multiplied to produce a partial matrix 520. Each element in the partial matrix 520 is an expected sum of elements of a plurality of items contained in the resulting matrix 320. An item in the resulting matrix 320 can be the whole resulting matrix 320 or a group of elements in the resulting matrix 320. The group of elements in the resulting matrix 320 can be contiguous or noncontiguous.

Each element in the partial matrix 560 is an actual sum of elements of the plurality of items contained in the resulting matrix 320. For example, each element 550, 552, 554, 556 is a sum of elements of a plurality of items 540, 542, 544, 546, respectively. In other words, element 550 is the sum of all elements in the item 540; element 552 is the sum of all elements in the item 542; element 554 is the sum of all elements in the item 544; element 556 is a sum of all elements in the item 546.

Similarly, elements 562, 564, 566 are a sum of elements of another plurality of items contained in the resulting matrix 320. Let us say that matrix 320 contains row0-row7, and column0-column7, where the upper left corner of the matrix 320 is the intersection of row0 and column0. Thus, element 562 is equal to the sum of all the elements in row0-row3. Element 564 is equal to sum of all elements in row0-row1, and row4-row5. Element 566 is equal to sum of all elements in row0, row2, row4, row6.

As can be seen in FIG. 5, elements in partial matrices 520 and 560 have one-to-one correspondence. When the resulting matrix 320 does not contain any errors, the corresponding elements in partial matrix 520 and partial matrix 560 are equal. However, as seen in FIG. 5, when the resulting matrix 320 contains an error, there is a discrepancy between the elements in partial matrix 520 and the corresponding elements in partial matrix 560.

As described herein, the number of operations required to perform the matrix multiplication is $O(N^3)$, where N×N is the size of the input matrices 300, 310, and the resulting matrix 320. The number of operations required to produce the partial matrix 520 is N additions for each element in the 2 matrices 500, 510, and N multiplications for each element in the partial matrix 520. There are total of $N^2$ elements in the two matrices 500, 510. There are $(\log_2 N)*2+1$ elements in the partial matrix 520. Thus, the number of operations required to produce the partial matrix 520 is N additions*$N^2$+N multiplications*$((\log_2 N)*2+1)=O(N^3)$. Given that multiplications are more expensive than additions, comparing the number of multiplications is an important measure of the error checking efficiency. The number of multiplications in the matrix multiplication is $O(N^3)$, while the number of multiplications in detecting the location and the magnitude of the error is $(N*\log_2 N)$. Thus, the number of multiplications in error checking is at least exponentially fewer than the number of multiplications in the matrix multiplication.

Figure 6:
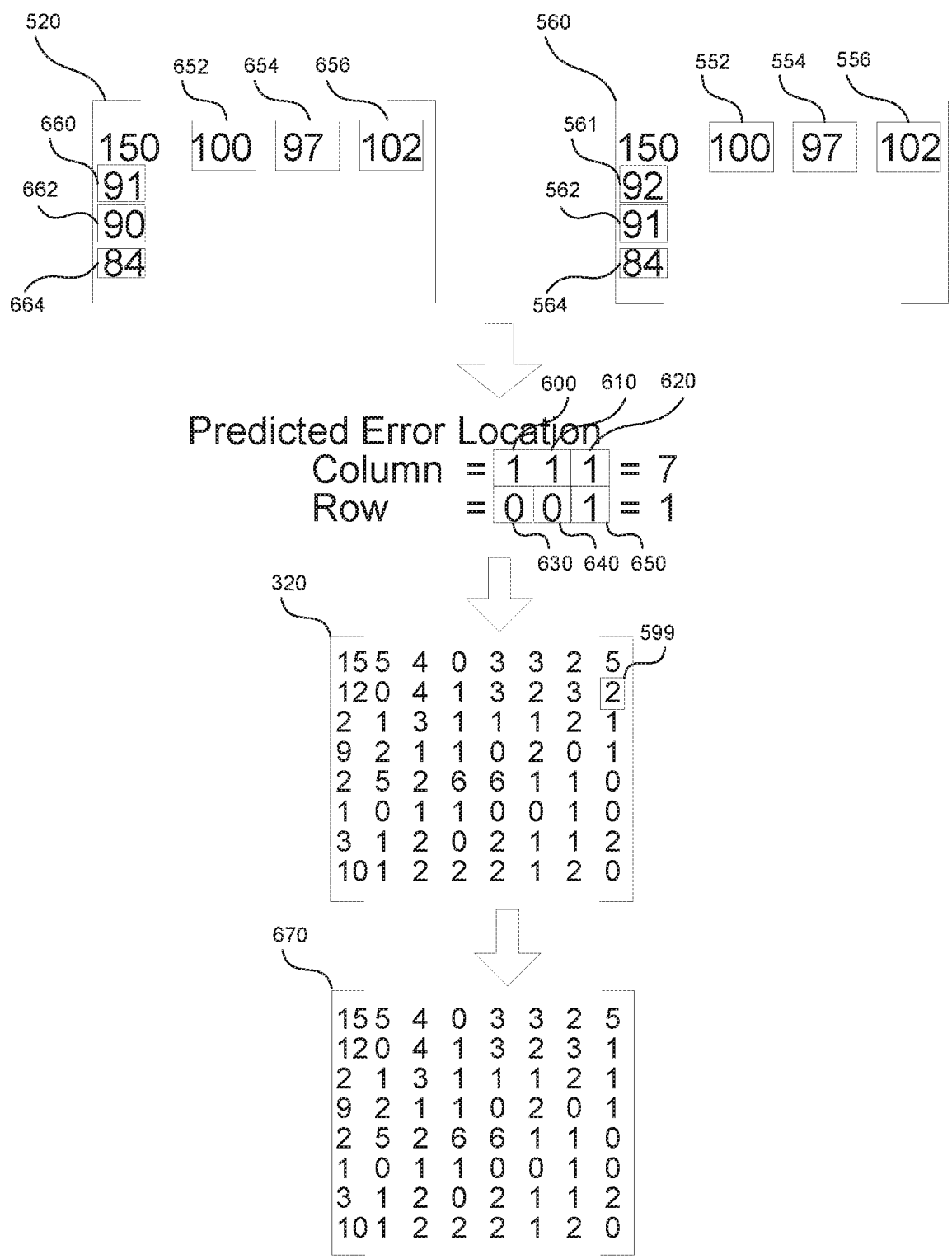
FIG. 6 shows a method to detect the location and magnitude of an error in the resulting matrix, according to one embodiment.

FIG. 6 shows a method to detect the location and magnitude of an error in the resulting matrix, according to one embodiment. Each element in the partial matrix 520 corresponds to one element in the partial matrix 560. As described herein, each element in the partial matrix 560 is an actual sum of elements of the plurality of items contained in the resulting matrix 320. When an element in the partial matrix 520 does not match the corresponding element in the partial matrix 560, that means that the corresponding item in the resulting matrix 320 contains an error. To detect the location and the magnitude of the error, the error correcting module 100 compares each element in the partial matrix 520 to the corresponding element in the partial matrix 560.

To detect the column in the resulting matrix 320 in which the error occurs, the error correcting module 100 compares element 652 in partial matrix 520 and element 552 in partial matrix 560. When element 652 and element 552 are equal, the error correcting module 100 records a value of 1 in bit 600. When element 652 and element 552 are not equal, the error correcting module 100 records a value of 0 in bit 600. The error correcting module 100 compares element 654 in partial matrix 520 and element 554 and partial matrix 560 and records either 1 or 0 in bit 610, depending on whether the elements are equal or not equal, respectively. To generate bit 620, the error correcting module 100 compares element 656 and element 556. The three bits 600, 610, 620, interpreted as a binary number, produce the column location of the error 599 in the resulting matrix 320. The number of bits 600, 610, 620 that may be required to find the column location of the error 599 vary depending on the size of the resulting matrix 320. Let us assume that the size of the resulting matrix 320 is N columns. The number of bits required to find the column location of the error 599 equals ($\log_2 N$)+1.

Similarly, to detect the row in the resulting matrix 320 in which the error occurs, the error correcting module 100 compares element 660 in partial matrix 520 and element 561 in partial matrix 560. When element 660 and element 561 are equal, the error correcting module 100 records a value of 1 in bit 630. When element 660 and element 561 are not equal, the error correcting module 100 records a value of 0 in bit 630. The error correcting module 100 compares element 662 in partial matrix 520, and element 562 and partial matrix 560, and records either 1 or 0 in bit 640, depending on whether the elements are equal or not equal, respectively. To generate bit 650, the error correcting module 100 compares element 664 and element 564. The three bits 630, 640, 650, interpreted as a binary number, produce the row location of the error 599 in the resulting matrix 320. The number of bits 630, 640, 650 required to find the column location of the error 599 vary depending on the size of the resulting matrix 320. Let us assume that the size of the resulting matrix 320 is M rows. The number of bits required to find the row location of the error 599 equals ($\log_2 M$)+1.

In FIG. 6, only elements 660, 662 in partial matrix 520 differ from their corresponding elements 561, 562 in partial matrix 560. Consequently, the column location of the erroneous element is 7 and the row location of the erroneous element is 1, which points to error 599 as the erroneous element. All the element pairs 660, 561, and 662, 562 differ by 1, and this difference represents the magnitude of the error in the error 599. The error correcting module 100 corrects the error 599 in matrix 320 to produce the corrected final result, matrix 670.

Figure 7B:
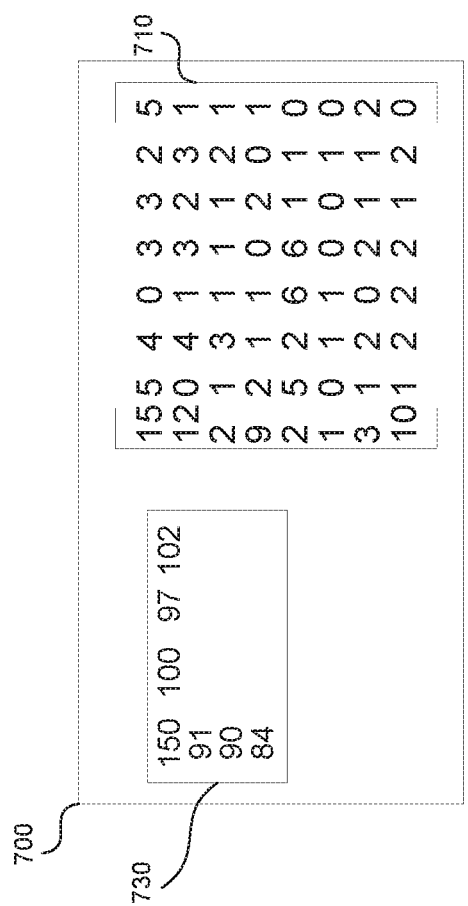
FIG. 7B shows an error correcting data structure used in detecting errors in data read from memory, according to another embodiment.
Figure 7A:
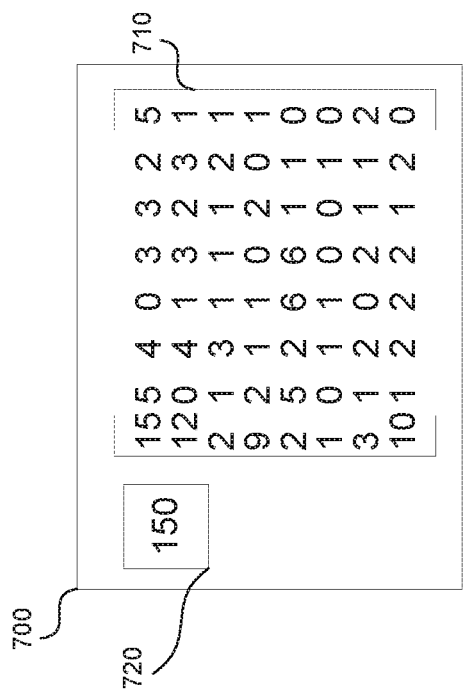
FIG. 7A shows an error correcting data structure used in detecting errors in data read from memory, according to one embodiment.

FIG. 7A shows an error correcting data structure used in detecting errors in data read from memory, according to one embodiment. The error correcting data structure 700 used in detecting errors includes the matrix 710 and error correcting code 720, which equals to the sum of all the elements in the matrix 710. The matrix 710 can be stored in memory as an array as a triplet representation, as a linked representation, etc. The error correcting code 720 can be stored in memory as an integer, a floating-point number, etc. The error correcting code 720 can be the first element in the error correcting data structure 700, followed by the matrix 710, or the matrix 710 can be the first element in the error correcting data structure 700, followed by the error correcting code 720. The error correcting module 100 can compute the error correcting code 720 and store the error correcting code 720 in memory along with the matrix 710, thus creating the error correcting data structure 700.

The memory storing the error correcting data structure 700 can be a semiconductor memory such as flash memory, a magnetic memory such as a hard disk drive, optical memory such as a CD (Compact Disk) or a DVD (Digital Versatile Disc), etc. The memory can be corrupted due to external influences such as electric fields, magnetic fields, cosmic rays, Alpha radiation, gamma radiation, erroneous memory reads, etc. Memory corruption can be detected more easily when using the error correcting data structure 700 due to redundant information in the error correcting code 720.

Specifically, when the matrix 710 is read from the memory, the error correcting module 100 can perform a summation of all the elements in the matrix 710. If the results of the summation do not match the error correcting code 720, an error is detected. The error is more likely present in the matrix 710 instead of the error correcting code 720, because the matrix 710 has a larger size and is consequently more likely to be corrupted.

FIG. 7B shows an error correcting data structure used in detecting errors in data read from memory, according to another embodiment. The error correcting data structure 700 includes the matrix 710 and the error correcting code 730. The error correcting code 730 can be stored as an array, as a linked list, etc. The error correcting code 730 contains expected sums of various items in the matrix. The various items in the matrix can be 540, 542, 544, 546 as shown in FIG. 5.

When the matrix 710 is read from the memory, the error correcting module 100 can perform a summation of various items in the matrix 710, e.g., items 540, 542, 544, 546 as shown in FIG. 5. The error correcting module 100 also reads the stored error correcting code 730. When at least one stored error correcting code 730 does not match at least one summation of various items, the error correcting module 100 detects the location and magnitude of the error and corrects the error, as described in FIG. 6.

Figure 8:
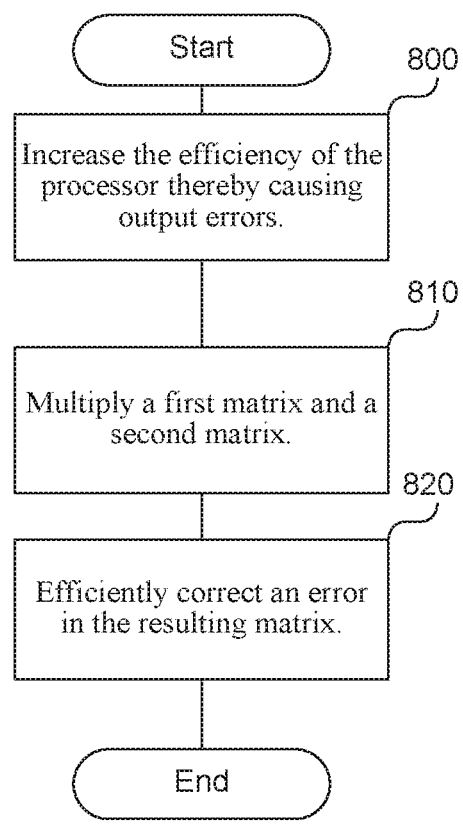
FIG. 8 is a flowchart of a method to increase an efficiency of a processor, by detecting and correcting errors in matrix multiplication, according to one embodiment.

FIG. 8 is a flowchart of a method to increase an efficiency of a processor by detecting and correcting errors in matrix multiplication, according to one embodiment. In step 800, the efficiency of the processor is increased, thereby causing an increase in erroneous output from the processor. Increasing the efficiency of the processor includes reducing power consumption of the processor, increasing clock speed of the processor, or placing building blocks of the processor closer to each other, thus reducing the size of the processor while keeping processing performance the same. Building blocks of the processor can be transistors, memristors, quantum computing elements, etc.

In step 810, a computing device, such as a processor and/or an electronic circuit 110 in FIG. 1, multiplies a first matrix and a second matrix to obtain a resulting matrix. In step 820, an error correcting module efficiently corrects an error in the resulting matrix by performing a plurality of computations, wherein the plurality of computations are less expensive than multiplying the first matrix and the second matrix.

For example, to detect the error in the resulting matrix, the error correcting module 100 calculates a plurality of expected results, e.g., partial matrix 520 in FIG. 5, for a plurality of items, e.g., 540, 542, 544 in FIG. 5, of the resulting matrix, based on a corresponding plurality of items of the first matrix and a corresponding plurality of items of the second matrix. An item in the resulting matrix 320 can be the whole resulting matrix 320 or a group of elements in the resulting matrix 320. The group of elements in the resulting matrix 320 can be contiguous or noncontiguous.

The error correcting module 100 calculates a plurality of actual results, e.g., partial matrix 560 in FIG. 5, for the plurality of items, e.g., 540, 542, 544 in FIG. 5, of the resulting matrix based on the resulting matrix. The plurality of actual results can be calculated by summing all the elements in each item in the plurality of items 540, 542, 544 in FIG. 5. When at least one expected result in the plurality of expected results differs from a corresponding actual result in the plurality of actual results, the error correcting module detects the error. Upon detecting the error, based on the difference between the at least one expected result and the corresponding actual result, the error correcting module 100 corrects the error.

For example, in FIG. 6, the error correcting module 100 determines that the expected result 660 is 1 less than the actual result 561. Consequently, the error correcting module 100 reduces the erroneous results in the resulting matrix by 1. The location of the error can be found as described throughout the specification, for example, as described in FIG. 6.

Figure 9:
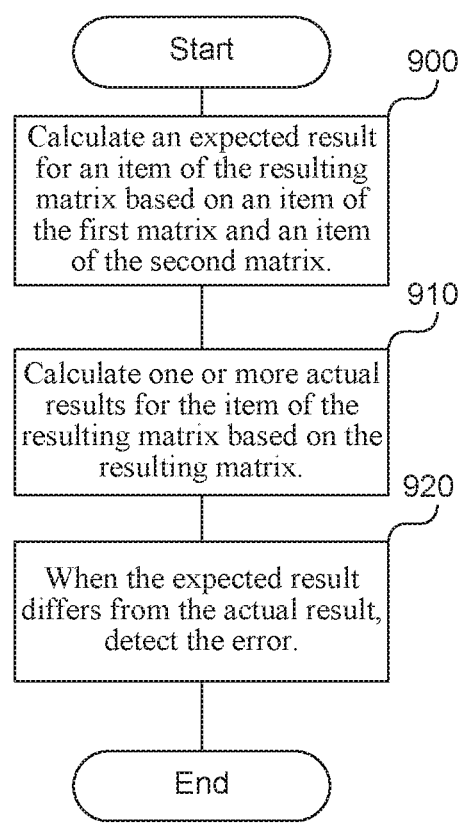
FIG. 9 is a flowchart of a method to increase an efficiency of a processor, by detecting errors in matrix multiplication, according to one embodiment.

FIG. 9 is a flowchart of a method to increase an efficiency of a processor by detecting errors in matrix multiplication, according to one embodiment. A computing device, such as a processor or an electronic circuit 110 in FIG. 1, multiplies a first matrix and a second matrix to obtain a resulting matrix. An error correcting module efficiently detects an error in the resulting matrix by performing a number of computations, such that the number of computations is fewer than a number of computations required in multiplying the first matrix and the second matrix.

To efficiently detect the error, the error correcting module 100 performs the following steps. In step 900, the error correcting module 100 calculates an expected result for an item of the resulting matrix based on an item of the first matrix and an item of the second matrix. The item of the first matrix and the item of the second matrix, when multiplied, produce the item of the resulting matrix. An item in a matrix can be the whole matrix or a group of elements in the matrix. The group of elements in the matrix can be contiguous or noncontiguous.

For example, calculating the expected result for the item of the resulting matrix based on the item of the first matrix and the item of the second matrix can include the error correcting module 100 determining an expected sum 370 in FIG. 3 of all elements associated with the resulting matrix 320 in FIG. 3.

In step 910, the error correcting module 100 calculates one or more actual results for the item of the resulting matrix based on the resulting matrix, as explained in FIG. 3. For example, to calculate one or more actual results for the item of the resulting matrix, the error correcting module 100 can determine an actual sum 380 in FIG. 3 of all elements associated with the resulting matrix 320 in FIG. 3. In step 920, the error correcting module 100 detects the error when the expected result, e.g., expected result 370 in FIG. 3, differs from the actual result, e.g., actual result 380 in FIG. 3.

Further, the error correcting module 100 can monitor an error rate of the error. When the error rate is above a predefined threshold, the error correcting module 100 can do one or more of the following: generate a notification to change the computing device, dynamically adjust the voltage input into the computing device, signal to the computing device to repeat the matrix multiplication, etc. The predefined threshold can be 1 error per second, 1 error per minute per minute, etc., depending on how many bit errors can be corrected and depending on the use case. The error correcting module 100 can dynamically adjust the voltage into the whole computing device, or a computing unit within the computing device where the computing unit can include one or more building blocks of the computing device.

The error correcting module 100 and can detect a location and a magnitude of the error in the resulting matrix in various ways. Once the location and the magnitude of the error are detected, the error correcting module 100 can correct the error in the resulting matrix.

In one embodiment, the error correcting module 100 calculates a plurality of expected results, e.g., partial matrix 520 in FIG. 5, for a plurality of parts of the resulting matrix, e.g., 540, 542, 544 in FIG. 5. The error correcting module 100 calculates the plurality of expected results, e.g., partial matrix 520 in FIG. 5, based on a corresponding plurality of items of the first matrix and a corresponding plurality of items of the second matrix. The error correcting module 100 calculates a plurality of corresponding actual results, e.g., partial matrix 560 in FIG. 5, for the plurality of items of the resulting matrix, e.g., 540, 542, 544 in FIG. 5. Calculating the plurality of corresponding actual results, e.g., partial matrix 560 in FIG. 5, can include summing all the elements in each part of the resulting matrix, e.g., 540, 542, 544 in FIG. 5. The error correcting module 100 compares the plurality of expected results, partial matrix 520 in FIG. 5, with the plurality of corresponding actual results, partial matrix 560 FIG. 5. When at least one expected result in the plurality of expected results contained in the partial matrix 520 in FIG. 5, differs from a corresponding actual result in the plurality of corresponding actual results contained in the partial matrix 560 FIG. 5, the error correcting module 100 calculates the location and the magnitude of the error in the resulting matrix, as described herein.

In another embodiment, the error correcting module 100 calculates the location and magnitude of the error using a binary search. Upon detecting the error, the error correcting module 100 divides the resulting matrix into a plurality of sub matrices until the smallest matrix in the plurality of sub matrices contains one erroneous element, as shown in FIG. 4. Once the error 499 in FIG. 4 is found, the error 499 can be corrected in various ways. For example, matrix multiplication can be performed again, or the corresponding row in the first matrix can be multiplied by the corresponding column in the second matrix to produce a corrected element instead of the error 499.

The error correcting module 100 can detect corruption of data stored in a memory, such as a flash memory, hard disk, etc. Before storing a matrix, the error correcting module 100 calculates the sum of all the elements in the matrix and jointly stores the sum of all matrix elements and the matrix in the memory, for example, as shown in FIG. 7A. When the matrix is read from the memory, an error can occur due to corrupted storage or due to an error in reading. When reading the matrix for memory, the error correcting module 100 sums all the elements of the read matrix and compares the resulting sum to the sum stored in the memory. When the resulting sum and the sum stored in memory differ, the error correcting module 100 reports an error. Additionally, as described in FIG. 7B, the error correcting module 100 can detect and correct the error.

Additional Considerations

At least one embodiment disclosed herein is a method to increase an efficiency of a processor thereby causing an increase in erroneous output from the processor. The method comprises: multiplying a first matrix and a second matrix, said multiplying the first matrix and the second matrix comprising obtaining a resulting matrix; and efficiently correcting an error in the resulting matrix by performing a plurality of multiplication computations, wherein the plurality of multiplication computations are exponentially less expensive than said multiplying the first matrix and the second matrix. Detecting the error in the resulting matrix comprises calculating a plurality of expected results for a plurality of items of the resulting matrix based on a corresponding plurality of items of the first matrix and a corresponding plurality of items of the second matrix; calculating a plurality of actual results for the plurality of items of the resulting matrix based on the resulting matrix; and when at least one expected result in the plurality of expected results differs from a corresponding actual result in the plurality of actual results, detecting the error. Upon detecting the error, based on a difference between the at least one expected result and the corresponding actual result, the error is corrected.

At least one embodiment disclosed herein is a method comprising: obtaining a first matrix, a second matrix, and a resulting matrix, the resulting matrix comprising a result of multiplying the first matrix by the second matrix; and efficiently detecting an error in the resulting matrix by performing a number of computations, wherein the number of computations is at least exponentially fewer than a number of computations required in said multiplying the first matrix and the second matrix. Efficiently detecting the error in the resulting matrix comprises calculating an expected result for an item of the resulting matrix based on an item of the first matrix and an item of the second matrix, wherein the item of the first matrix and the item of the second matrix combine to produce the item of the resulting matrix, wherein the item of the resulting matrix comprises at least one of a whole matrix or a part of the whole matrix, the corresponding item of the first matrix comprises at least one of a whole first matrix or a part of the whole first matrix, the corresponding item of the second matrix comprises at least one of a whole second matrix or a part of the whole second matrix; calculating one or more actual results for the item of the resulting matrix based on the resulting matrix; and when the expected result differs from the actual result, detecting the error. The method further comprises based on an error rate of the detected error, adjusting a voltage input into a computing device performing the matrix multiplication.

The method comprises, when the error rate is above a predefined threshold, generating a notification to change the computing device performing the matrix multiplication. The method comprises, when the error rate is below a predefined threshold, dynamically decreasing the voltage input into the computing device performing the matrix multiplication. The method comprises, upon detecting the error, causing the computing device performing the matrix multiplication to repeat the matrix multiplication.

Efficiently detecting the error in the resulting matrix can comprise determining an expected sum of all elements associated with the resulting matrix; determining an actual sum of all elements associated with the resulting matrix; and when the expected sum and the actual sum differ, detecting the error.

The method comprises detecting a location and a magnitude of the error in the resulting matrix; and correcting the error in the resulting matrix. Detecting the location and the magnitude of the error in the resulting matrix comprises calculating a plurality of expected results for a plurality of parts of the resulting matrix based on a corresponding plurality of parts of the first matrix and a corresponding plurality of parts of the second matrix; calculating a plurality of corresponding actual results for the plurality of parts of the resulting matrix based on the resulting matrix; and comparing the plurality of expected results with the plurality of corresponding actual results. The method comprises when at least one expected result in the plurality of expected results differs from a corresponding actual result in the plurality of corresponding actual results, calculating the location and the magnitude of the error in the resulting matrix.

The method comprises calculating a sum of all elements in a matrix; and jointly storing in a memory the sum of all elements in the matrix, and the matrix.

The method comprises reading from the memory the matrix and the sum of all elements; and when the sum of all elements in the matrix read from the memory does not equal the sum of all elements read from the memory, detecting the error.

The method comprises upon detecting the error, dividing the resulting matrix into a plurality of sub matrices until the smallest matrix in the plurality of sub matrices contains one erroneous element; and correcting the erroneous element.

At least one embodiment of the present disclosure includes an apparatus comprising a computing device to multiply a first matrix and a second matrix to obtain a resulting matrix, the computing device to run at an increased clock speed; and an error correcting module to efficiently detect a location and a magnitude of an error in the resulting matrix by performing a number of multiplication computations and a number of addition computations, wherein the number of multiplication computations is at least exponentially fewer than a number of multiplication computations required to multiply the first matrix and the second matrix.

The error correcting module can calculate an expected result for an item of the resulting matrix based on an item of the first matrix and an item of the second matrix, wherein the item of the first matrix and the item of the second matrix combine to produce the item of the resulting matrix, wherein the item of the resulting matrix comprises at least one of a whole matrix or a part of the whole matrix, the corresponding item of the first matrix comprises at least one of a whole first matrix or a part of the whole first matrix, the corresponding item of the second matrix comprises at least one of a whole second matrix or a part of the whole second matrix; calculate one or more actual results for the item of the resulting matrix based on the resulting matrix; and when the expected result differs from the actual result, detect the error.

The error correcting module can monitor an error rate associated with the error; and when the error rate is above a predefined threshold, generate a notification to change the computing device.

The error correcting module can determine a computing unit of the computing device producing the error, wherein the computing unit is a part of the computing device; and increase voltage input into the computing unit.

The error correcting module can monitor an error rate associated with the error; and when the error rate is above a predefined threshold, dynamically adjust a voltage input into the computing device.

The error correcting module can determine an expected sum of all elements associated with the resulting matrix; determine an actual sum of all elements associated with the resulting matrix; and when the expected sum and the actual sum differ, detect the error.

The error correcting module can correct the error in the resulting matrix.

The computing device can multiply the first matrix and the second matrix upon detecting the error, by the error correcting module.

Upon detecting the error, by the error correcting module, the computing device can permute a first group of elements in the first matrix, and a second group of elements in the second matrix; multiply the permuted first matrix and the permuted second matrix to obtain a permuted resulting matrix; and permute a group of elements in the permuted resulting matrix to obtain the resulting matrix.

The error correcting module can calculate a sum of all elements in a matrix; jointly store in a memory the sum of all elements, and the matrix; read from the memory the matrix and the sum of all elements; and when the sum of all elements in the matrix read from the memory does not equal the sum of all elements read from the memory, detect the error.

The error correcting module can, upon detecting the error, divide the resulting matrix into a plurality of sub matrices until the smallest matrix in the plurality of sub matrices contains one erroneous element; and correct the erroneous element.

At least one embodiment of the present disclosure includes an apparatus. The apparatus comprises a computing device to multiply a first matrix and a second matrix to obtain a resulting matrix. The apparatus comprises a non-transitory computer-readable medium storing instructions. The instructions when executed by a processor cause the processor to detect a location and a magnitude of an error in the resulting matrix by performing a number of multiplication computations, wherein the number of multiplication computations is fewer than a number of multiplication computations involved in multiplying the first matrix and the second matrix; and correct the error in the resulting matrix based on the location and the magnitude of the error.

The location and the magnitude of the error can be detected by calculating a plurality of expected results for a plurality of items of the resulting matrix based on a corresponding plurality of items of the first matrix and a corresponding plurality of items of the second matrix; calculating a plurality of actual results for the plurality of items of the resulting matrix based on the resulting matrix; and detecting the location and magnitude of the error responsive to an expected result in the plurality of expected results differing from a corresponding actual result in the plurality of actual results.

The magnitude of the error can be determined to be a difference between the expected result in the plurality of expected results and the corresponding actual result in the plurality of actual results. The location of the error can be detected by detecting a column of the error and detecting a row of the error based on the expected results and the actual results.

The instructions can cause the processor to monitor an error rate associated with the error; and responsive to the error rate being above a predefined threshold, generate a notification to change the computing device.

The instructions can cause the processor to determine a computing unit of the computing device producing the error and increase voltage input into the computing unit.

The instructions can cause the processor to monitor an error rate associated with the error; and responsive to the error rate being above a predefined threshold, dynamically adjust a voltage input into the computing device.

The instructions can cause the processor to cause the computing device to repeat multiplication of the first matrix and the second matrix responsive to detection of the error.

The computing device can, responsive to detection of the error: permute a first group of elements in the first matrix, and a second group of elements in the second matrix; multiply the permuted first matrix and the permuted second matrix to obtain a permuted resulting matrix; and permute a group of elements in the permuted resulting matrix to obtain the resulting matrix.

At least one embodiment of the present disclosure includes an apparatus. The apparatus comprises a computing device to multiply a first matrix and a second matrix to obtain a resulting matrix. The apparatus comprises an error correcting circuit to detect a location and a magnitude of an error in the resulting matrix by performing a number of multiplication computations, wherein the number of multiplication computations is fewer than a number of multiplication computations involved in multiplying the first matrix and the second matrix. The error correcting circuit corrects the error in the resulting matrix based on the location and the magnitude of the error.

The error correcting circuit can detect the location of the magnitude of the error by calculating a plurality of expected results for a plurality of items of the resulting matrix based on a corresponding plurality of items of the first matrix and a corresponding plurality of items of the second matrix; calculating a plurality of actual results for the plurality of items of the resulting matrix based on the resulting matrix; and detecting the location and magnitude of the error responsive to an expected result in the plurality of expected results differing from a corresponding actual result in the plurality of actual results.

Computer

Figure 10:
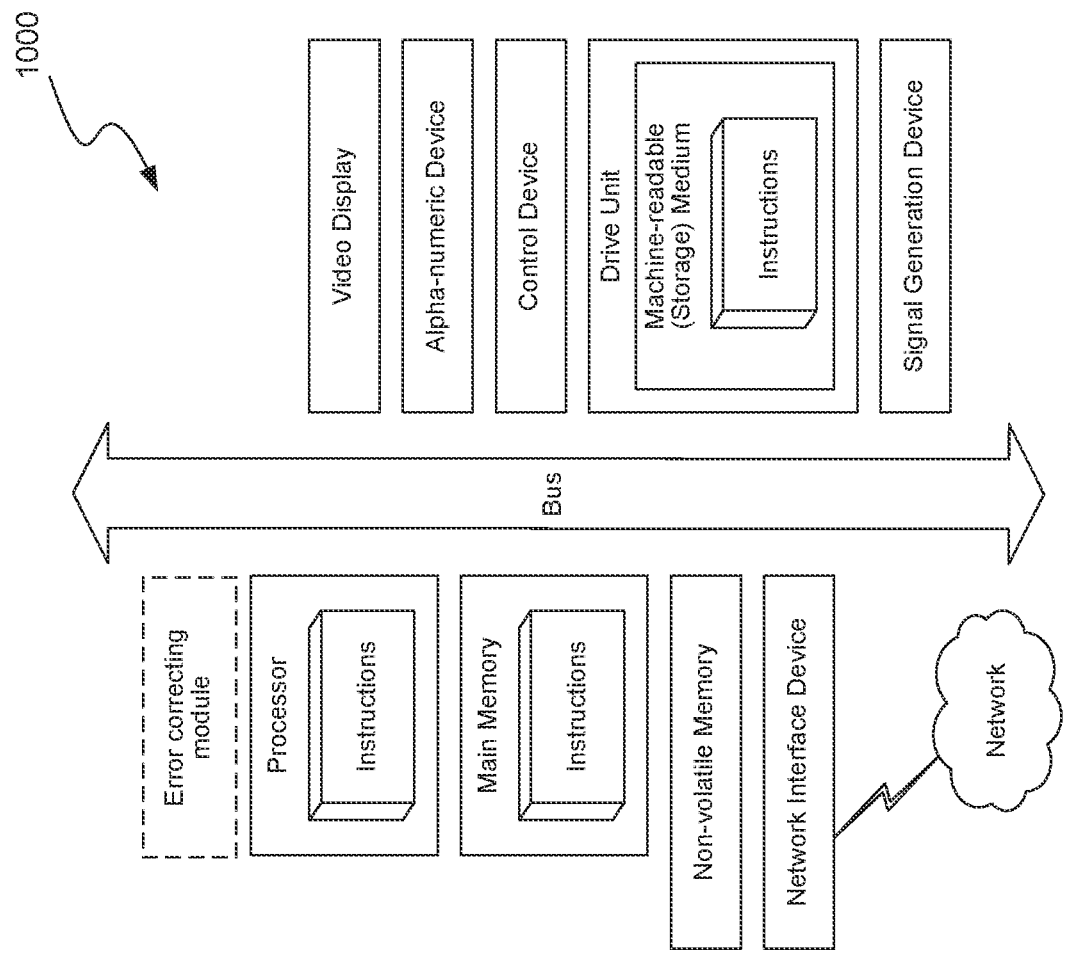
FIG. 10 is a diagrammatic representation of a machine in the example form of a computer system 1000 within which a set of instructions for causing the machine to perform any one or more of the methodologies or modules discussed herein may be executed.

FIG. 10 is a diagrammatic representation of a machine in the example form of a computer system 1000 within which a set of instructions for causing the machine to perform any one or more of the methodologies or modules discussed herein, may be executed.

In the example of FIG. 10, the computer system 1000 includes a processor, memory, non-volatile memory, and an interface device. The processor can perform the matrix multiplication described in the specification. The error correcting module 100 can be a hardware component of the processor, can run as a software on the processor, and/or can be a separate error correcting module as shown in FIG. 10. Various common components (e.g., cache memory) are omitted for illustrative simplicity. The computer system 1000 is intended to illustrate a hardware device on which any of the components described in the example of FIGS. 1-9 (and any other components described in this specification) can be implemented. The computer system 1000 can be of any applicable known or convenient type. The components of the computer system 1000 can be coupled together via a bus or through some other known or convenient device.

This disclosure contemplates the computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform, without substantial spatial or temporal limitation, one or more steps of one or more methods described or illustrated herein. As an example and not by way of limitation, one or more computer systems 1000 may perform, in real time or in batch mode, one or more steps of one or more methods described or illustrated herein. One or more computer systems 1000 may perform, at different times or at different locations, one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1000. The non-volatile storage can be local, remote, or distributed. The non-volatile memory is optional, because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this application. Even when software is moved to memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1000. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 10 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the machine and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An apparatus comprising:
a computing device configured to multiply a first matrix and a second matrix to obtain a resulting matrix; and
a non-transitory computer-readable medium storing instructions, the instructions when executed by a processor cause the processor to:
calculate a first intermediate matrix and a second intermediate matrix, the first intermediate matrix comprising one or more rows each having values corresponding to sums of one or more respective subsets of values of corresponding columns of the first matrix, and the second intermediate matrix comprising one or more columns each having values corresponding to sums of one or more respective subsets of values of corresponding rows of the second matrix;
calculate an expected partial matrix as a partial product of the first intermediate matrix and the second intermediate matrix, comprising a first row and a first column;

calculate a resulting partial matrix, comprising a first row where each value of the first row corresponds to a sum of values of one or more respective subsets of values of columns of the resulting matrix, and a first column where each value of the first column corresponds to a sum of one or more respective subsets of values of rows of the resulting matrix;

detect a location and a magnitude of an error in the resulting matrix based upon one or more differences between corresponding values of the expected partial matrix and the resulting partial matrix;

correct the error in the resulting matrix based on the location and the magnitude of the error;

determine a computing unit of the computing device producing the error; and increase voltage input into the computing unit.

2. The apparatus of claim 1, wherein the location and the magnitude of the error is detected by:

determining a row of the resulting matrix corresponding to the error based upon a difference between values of the first row of the expected partial matrix and the resulting partial matrix; and determining a column of the resulting matrix corresponding to the error based upon a difference between values of the first column of the expected partial matrix and the resulting partial matrix.

3. The apparatus of claim 1, wherein the magnitude of the error is determined to be a magnitude of one or more differences between corresponding values of the expected partial matrix and the resulting partial matrix.

4. The apparatus of claim 1, wherein the one or more respective subsets of values of corresponding columns of the first matrix comprises half of the values of the corresponding column, and the one or more respective subsets of values of corresponding rows of the second matrix comprises half of the values of the corresponding row.

5. The apparatus of claim 1, wherein the instructions cause the processor to:

monitor an error rate associated with the error; and responsive to the error rate being above a predefined threshold, generate a notification to change the computing device.

6. The apparatus of claim 1, wherein the instructions cause the processor to:

cause the computing device to repeat multiplication of the first matrix and the second matrix responsive to detection of the error.

7. The apparatus of claim 1, wherein responsive to detection of the error, the computing device is further configured to:

permute a first group of elements in the first matrix, and a second group of elements in the second matrix;

multiply the permuted first matrix and the permuted second matrix to obtain a permuted resulting matrix; and permute a group of elements in the permuted resulting matrix to obtain the resulting matrix.

8. A method comprising:

multiplying, by a computing device, a first matrix and a second matrix to obtain a resulting matrix;

calculating a first intermediate matrix and a second intermediate matrix, the first intermediate matrix comprising one or more rows each having values corresponding to sums of one or more respective subsets of values of corresponding columns of the first matrix, and the second intermediate matrix comprising one or more columns each having values corresponding to sums of one or more respective subsets of values of corresponding rows of the second matrix;

calculating an expected partial matrix as a partial product of the first intermediate matrix and the second intermediate matrix, comprising a first row and a first column;

calculating a resulting partial matrix, comprising a first row where each value of the first row corresponds to a sum of values of one or more respective subsets of values of columns of the resulting matrix, and a first column where each value of the first column corresponds to a sum of values of one or more respective subsets of values of rows of the resulting matrix;

detecting a location and a magnitude of an error in the resulting matrix based upon one or more differences between corresponding values of the expected partial matrix and the resulting partial matrix;

correcting the error in the resulting matrix based on the location and the magnitude of the error;

determining a computing unit of the computing device producing the error; and increasing voltage input into the computing unit.

9. The method of claim 8, wherein detecting the location of the error comprises:

determining a row of the resulting matrix corresponding to the error based upon a difference between values of the first row of the expected partial matrix and the resulting partial matrix; and determining a column of the resulting matrix corresponding to the error based upon a difference between values of the first column of the expected partial matrix and the resulting partial matrix.

10. The method of claim 8, wherein the magnitude of the error is determined to be a magnitude of one or more differences between corresponding values of the expected partial matrix and the resulting partial matrix.

11. The method of claim 8, wherein the one or more respective subsets of values of corresponding columns of the first matrix comprises half of the values of the corresponding column, and the one or more respective subsets of values of corresponding rows of the second matrix comprises half of the values of the corresponding row.

12. The method of claim 8, further comprising:

monitoring an error rate associated with the error; and responsive to the error rate being above a predefined threshold, generating a notification to change the computing device.

13. The method of claim 8, further comprising:

repeating multiplication of the first matrix and the second matrix responsive to detection of the error.

14. The method of claim 8, further comprising, responsive to detection of the error:

permuting a first group of elements in the first matrix, and a second group of elements in the second matrix;

multiplying the permuted first matrix and the permuted second matrix by the computing device to obtain a permuted resulting matrix; and permuting a group of elements in the permuted resulting matrix to obtain the resulting matrix.

15. An apparatus comprising:

a computing device for multiplying matrices;

a memory storing a resulting matrix received from the computing device, the resulting matrix corresponding to a product of a first matrix and a second matrix, and an error correcting circuit configured to:

calculate a first intermediate matrix and a second intermediate matrix, the first intermediate matrix comprising one or more rows each having values corresponding to sums of one or more respective subsets of values of corresponding columns of the first matrix, and the second intermediate matrix comprising one or more columns each having values corresponding to sums of one or more respective subsets of values of corresponding rows of the second matrix;

calculate an expected partial matrix as a partial product of the first intermediate matrix and the second intermediate matrix, comprising a first row and a first column;

calculate a resulting partial matrix, comprising a first row where each value of the first row corresponds to a sum of values of one or more respective subsets of values of columns of the resulting matrix, and a first column where each value of the first column corresponds to a sum of values of one or more respective subsets of values of rows of the resulting matrix;

detect at least a location of an error in the resulting matrix based upon one or more differences between corresponding values of the expected partial matrix and the resulting partial matrix; and generate a remedial action to be performed on the computing device, based upon the detected error in the resulting matrix, comprising determining a computing unit of the computing device producing the error, and increasing voltage input into the computing unit.

16. The apparatus of claim 15, wherein the error correcting circuit detects the location of the error by:

determining a row of the resulting matrix corresponding to the error based upon a difference between values of the first row of the expected partial matrix and the resulting partial matrix; and determining a column of the resulting matrix corresponding to the error based upon a difference between values of the first column of the expected partial matrix and the resulting partial matrix.

17. The apparatus of claim 15, wherein generating the remedial action to be performed on the computing device further comprises:

monitoring an error rate associated with the error; and performing the remedial action in response to the error rate being above a predetermined threshold.

18. The apparatus of claim 17, wherein the performing the remedial action further comprises generating a notification to change the computing device, or dynamically adjusting a voltage input into the computing device or a computing unit of the computing device.

19. The apparatus of claim 15, wherein the error correcting circuit is further configured to:

detect a magnitude of the error in the resulting matrix based upon the one or more differences between corresponding values of the expected partial matrix and the resulting partial matrix; and correct the error in the resulting matrix stored in the memory, based on the location and the magnitude of the error.

20. The apparatus of claim 15, wherein the error correcting circuit is further configured to cause the computing device to repeat multiplication of the first matrix and the second matrix responsive to detection of the error.

* * * * *